United States Patent
Deshpande et al.

(10) Patent No.: US 6,317,811 B1
(45) Date of Patent: Nov. 13, 2001

(54) METHOD AND SYSTEM FOR REISSUING LOAD REQUESTS IN A MULTI-STREAM PREFETCH DESIGN

(75) Inventors: Sanjay Raghunath Deshpande, Austin; David Mui, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,737

(22) Filed: Aug. 26, 1999

(51) Int. Cl.$^7$ .................................................. G06F 12/08
(52) U.S. Cl. .......................................... 711/137; 711/213
(58) Field of Search ................................... 711/129, 137, 711/213

(56) References Cited

U.S. PATENT DOCUMENTS

| | | | |
|---|---|---|---|
| 5,317,718 | * 5/1994 | Jouppi | 395/425 |
| 5,452,418 | * 9/1995 | Tatosian et al. | 395/250 |
| 5,490,113 | * 2/1996 | Tatosian et al. | 365/189.05 |
| 5,652,858 | * 7/1997 | Okada et al. | 395/464 |
| 5,737,568 | * 4/1998 | Mayfield | 395/421.03 |
| 5,758,119 | * 5/1998 | Mayfield | 395/449 |
| 5,761,706 | * 6/1998 | Kessler et al. | 711/118 |
| 5,958,040 | * 9/1999 | Jouppi | 712/207 |
| 6,085,291 | * 7/2000 | Hicks et al. | 711/137 |
| 6,253,306 | * 6/2001 | Ben-Meir et al. | 712/207 |

OTHER PUBLICATIONS

IBM Technical Disclosure Bulletin; M–Way Set Associative Prefetch/Stream Buffer Design; vol. 40, No. 12, Dec. 1997, pp. 129 –131.

* cited by examiner

Primary Examiner—Kevin L. Ellis
(74) Attorney, Agent, or Firm—Duke W. Yee; Casimer K. Salys

(57) ABSTRACT

A method and system for reissuing load requests in a multi-stream prefetch engine of a data processing system is provided. A read transaction is received from a transaction requester, and the read transaction has a base address and a prefetch stream identifier. The received read transaction is issued to a prefetch stream associated with a data prefetch buffer identified by the prefetch stream identifier as the prefetch stream is one of a set of prefetch streams, each of which has an associated prefetch buffer. The read transaction is issued to a prefetch stream associated with a data prefetch buffer, and a set of prefetch addresses are generated, each prefetch address in the set of prefetch addresses being proximate to the base address. A determination is made as to whether the data prefetch buffer has unallocated prefetch buffer entries, and a comparison is made between each prefetch address in the set of prefetch addresses and all prefetch addresses in each data prefetch buffer to determine whether a prefetch address in the set of prefetch addresses collides with a prefetch address in a data prefetch buffer. In response to a determination of an absence of an address collision and a determination that the data prefetch buffer does not have an unallocated prefetch buffer entry, the base address is held for data prefetch reissuance.

25 Claims, 6 Drawing Sheets

METHOD AND SYSTEM FOR REISSUING LOAD REQUESTS IN A MULTI-STREAM PREFETCH DESIGN

BACKGROUND OF THE INVENTION

1. Technical Field

The present invention relates generally to an improved data processing system and, in particular, to a method and system for improving data throughput within a data processing system. Specifically, the present invention relates to a method and system for improving performance of storage access and control using prefetch.

2. Description of Related Art

Rapid advances in integrated circuit technology and in computer architecture have resulted in an increasing "memory reference delay gap" between relatively fast processing units and relatively slow memory. High performance processors with high throughput are available as commercial products, and multiprocessor systems using these processors are also available. However, in order to run at their peak speeds, these high performance systems require memory systems that are able to send data to the processor as fast as the processor requires, otherwise the processor stalls while it is waiting for data to be delivered. Such memory systems may be complex and/or expensive. As a result, the performance bottleneck of many current high performance computer systems is not the speed of the processor but rather the efficiency of the memory system.

In order to overcome the problem of an increasingly large memory reference delay gap between fast processing units and slow memory, cache or buffer memories are used. Buffer memory is a small, high speed memory between a processor or processors and a memory subsystem of a computer system. Its primary purpose is to provide high speed data/ instruction accesses without the associated cost of an entire memory that uses high speed technology. This is achieved by keeping data and/or instructions that are expected to be referenced in the near future in the buffer.

When the required data for a requested memory transaction exists in the buffer, a "buffer hit" is said to occur, and the required data does not need to be fetched from slower, main memory. In contrast, when the required data for a requested memory transaction does not exist in the buffer, a "buffer miss" is said to occur, and the required data must be fetched from slower, main memory. Buffer misses are problematic because the amount of data that can be processed is limited to the speed at which data can be fetched from main memory. In general, system designers attempt to improve the buffer hit ratio so that the number of buffer misses are reduced and better performance can be obtained. As used herein, the term "buffer hit ratio" is defined as the probability that a data item requested by a processor unit will be found in the buffer, and the "buffer miss penalty" is defined as the time that the processing unit is required to wait for the requested data item to arrive when a buffer miss occurs.

In current buffer designs, instruction buffers are usually given a higher priority than data buffers for implementation and optimization. This is due to the current level of understanding of instruction reference behavior and data reference behavior and to the accuracy of current buffer models for instructions and for data. Since instruction references have a strong sequential reference characteristic, the prior art teaches a technique known as prefetching in which references are brought into the buffer memory before they are actually needed. If the prefetching is correct, memory reference delay times can be overlapped with program execution, at least partially overlapped and preferably completely overlapped. For non-sequential instruction references due to branch or jump instructions, "branch target prediction" may be used to predict the manner in which a program may execute. Together with the buffer prefetching technique, the number of buffer misses can be reduced if the prediction is correct.

Data reference behavior is generally considered random compared to instruction reference behavior. As a result, those buffering techniques that can improve instruction buffer performance might become ineffective when they are applied to data buffer performance. Since data reference behavior has been much less predictable than instruction reference behavior, buffer space may be wasted to store prefetched, non-referenced data, and data items in the buffer that are going to be referenced shortly might be replaced by non-referenced data. Branch technique prediction and the use of a branch target buffer are not applicable to data buffers as the distinction of branch references from sequential references in instruction references is not applicable to data references. Thus, it is much more difficult to improve the performance of data buffer designs than the performance of instruction buffer designs.

Therefore, it would be advantageous to have a method and system for improving the efficiency of a data buffer. It would be further advantageous to have a method and system for improving the efficiency of a data buffer through the use of enhanced buffer prefetching techniques.

SUMMARY OF THE INVENTION

A method and system for reissuing load requests in a multi-stream prefetch engine of a data processing system is provided. A read transaction is received from a transaction requester, and the read transaction has a base address and a prefetch stream identifier. The received read transaction is issued to a prefetch stream associated with a data prefetch buffer identified by the prefetch stream identifier as the prefetch stream is one of a set of prefetch streams, each of which has an associated prefetch buffer. The read transaction is issued to a prefetch stream associated with a data prefetch buffer, and a set of prefetch addresses are generated, each prefetch address in the set of prefetch addresses being proximate to the base address. A determination is made as to whether the data prefetch buffer has unallocated prefetch buffer entries, and a comparison is made between each prefetch address in the set of prefetch addresses and all prefetch addresses in each data prefetch buffer to determine whether a prefetch address in the set of prefetch addresses collides with a prefetch address in a data prefetch buffer. In response to a determination of an absence of an address collision and a determination that the data prefetch buffer does not have an unallocated prefetch buffer entry, the base address is held for data prefetch reissuance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
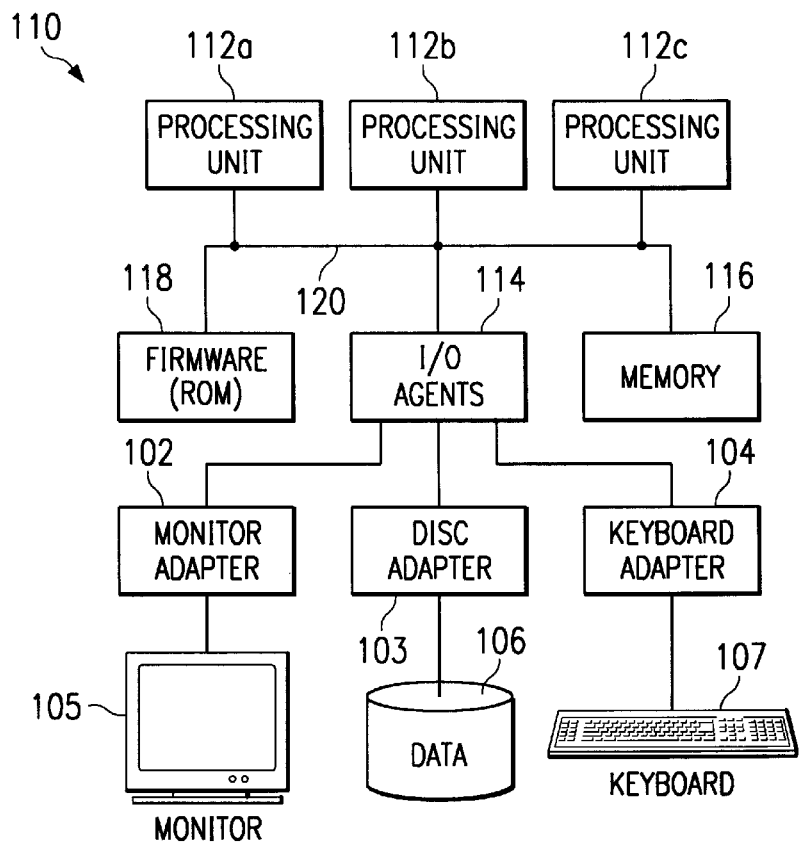
FIG. 1 is a block diagram depicting the basic structure of a conventional multiprocessor computer system.

With reference now to FIG. 1, the basic structure of a conventional multiprocessor computer system 110 is depicted. Computer system 110 has several processing units 112a, 112b, and 112c which are connected to various peripheral devices, including input/output (I/O) agents 114, which accept data from and provide data to a monitor adapter 102 and display monitor 105, keyboard adapter 104 and keyboard 107, and disk adapter 103 and permanent storage device 106, memory device 116 (such as dynamic random access memory or DRAM) that is used by the processing units to carry out program instructions, and firmware 118 whose primary purpose is to seek out and load an operating system from one of the peripherals (usually the permanent memory device) whenever the computer is first turned on. Processing units 112a–112c communicate with the peripheral devices by various means, including a bus 120. Computer system 110 may have many additional components which are not shown, such as serial and parallel ports for connection to peripheral devices, such as modems or printers. Those skilled in the art will further appreciate that there are other components that might be used in conjunction with those shown in the block diagram of FIG. 1; for example, a display adapter might be used to control a video display monitor, a memory controller can be used to access memory 116, etc. In addition, computer system 110 may be configured with more or fewer processors.

In a symmetric multiprocessor (SMP) computer, all of the processing units 112a–112c are generally identical; that is, they all use a common set or subset of instructions and protocols to operate and generally have the same architecture.

Figure 2:
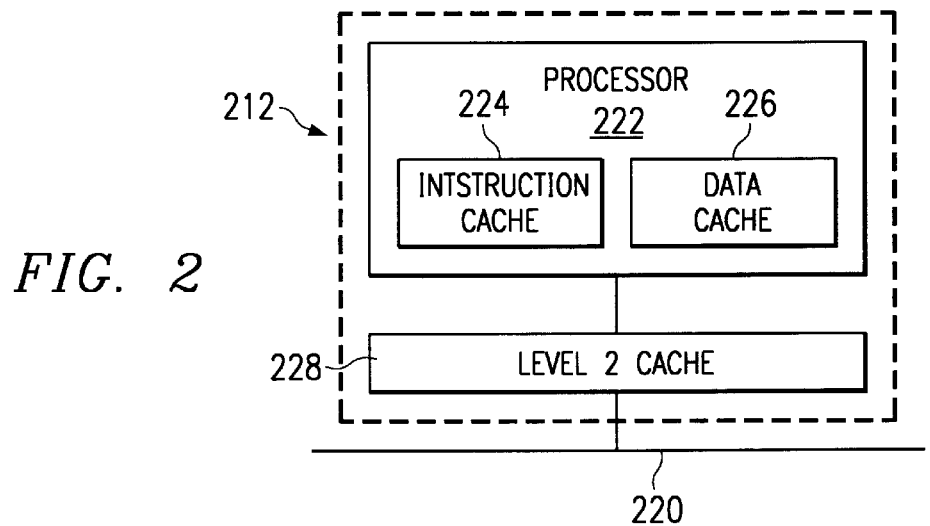
FIG. 2 is a block diagram depicting a typical architecture.

With reference now to FIG. 2, a typical organization is depicted. A processing unit 212 includes a processor 222 having a plurality of registers and execution units, which carry out program instructions in order to operate the computer. The processor can also have caches, such as an instruction cache 224 and a data cache 226. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory, such as memory 116 shown in FIG. 1.

Processing unit 212 can include additional caches, such as cache 228. Cache 228 is referred to as a level 2 (L2) cache since it supports the on-board (level 1) caches 224 and 226. In other words, cache 228 acts as an intermediary between memory 116 and the on-board caches, and can store a much larger amount of information (instructions and data) than the on-board caches, although at a longer access penalty. For example, cache 228 may be a chip having a storage capacity of 256 or 512 kilobytes, while the processor 212 may be an IBM PowerPC™ 604-series processor having on-board caches with 64 kilobytes of total storage. Cache 228 is connected to bus 220, and all loading of information from memory 116 into processor 212 must come through cache 228. Although FIG. 2 depicts only a two-level cache hierarchy, multi-level cache hierarchies can be provided where there are many levels of serially connected caches.

In an SMP computer, it is important to provide a coherent memory system, that is, to cause writes to each individual memory location to be serialized in some order for all processors. For example, assume a location in memory is modified by a sequence of writes to take on the values 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that ensures that each processor obtains valid data order is said to be "coherent." It is important to note that virtually all coherency protocols operate only to the granularity of the size of a cache block. That is to say, the coherency protocol controls the movement of the write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to perform the write command. The key issue is that all other processors in the system must be informed of the write command by the initiating processor before the write occurs. To further illustrate how cache coherence is implemented in multi-level hierarchies, consider FIG. 3.

Figure 3:
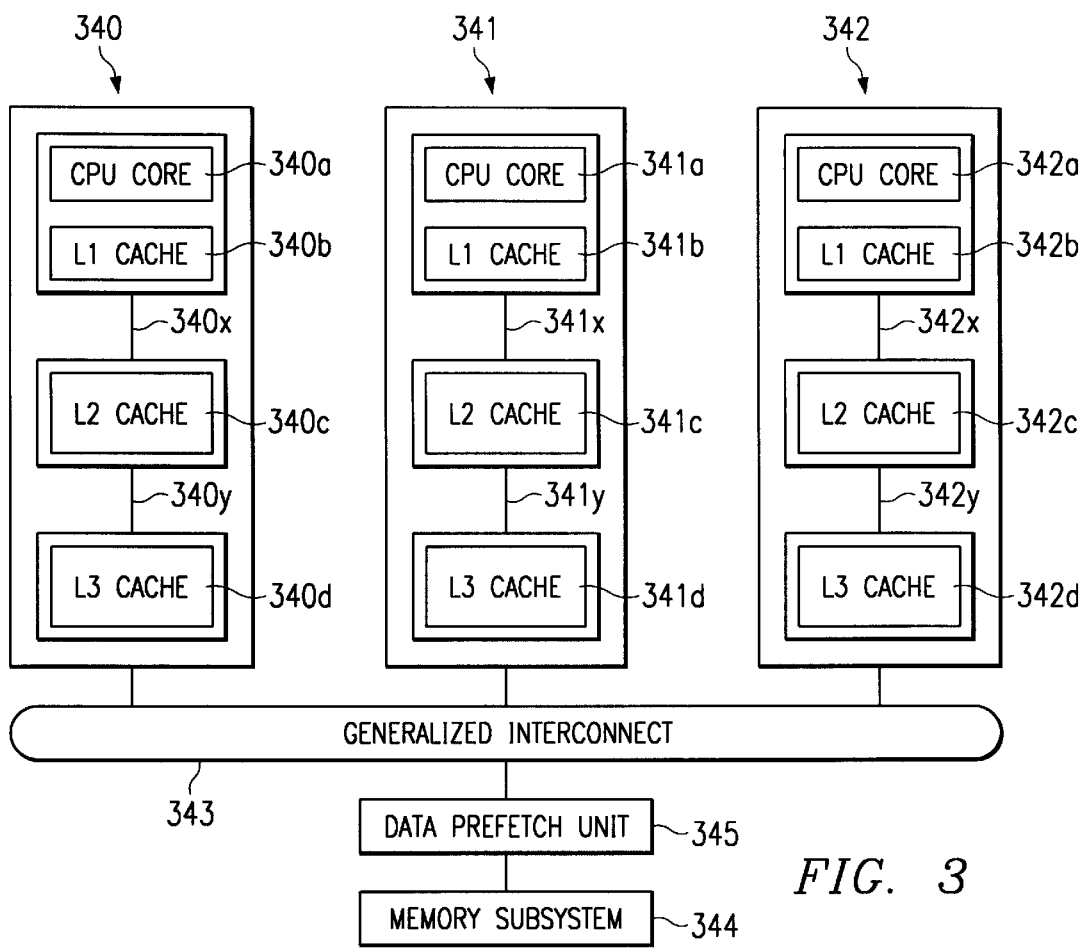
FIG. 3 is a block diagram depicting an SMP computer system with three processing units.

With reference now to FIG. 3, a computer system is depicted with three processing units (340, 341, 342) consisting of processors (340a, 341a, 342a) each having an L1 cache (340b, 341b, 342b) connected to an L2 cache (340c, 341c, 342c) via an inter-cache connection (340x, 341x, 342x), which is connected to an L3 cache (340d, 341d, 342d) via an inter-cache connection (340y, 341y, 342y). In this hierarchy, each lower-level cache (i.e., an L3 cache is "lower" than an L2) is typically larger in size and has a longer access time than the next higher-level cache. Furthermore, it is common, although not absolutely required, that the lower-level caches contain copies of all blocks present in the higher-level caches.

The processors communicate over generalized interconnect 343. The processors pass messages over the interconnect indicating their desire to read or write memory locations. When a memory transaction is placed on the interconnect, all of the other processors "snoop" this transaction and decide if the state of their caches can allow the requested transaction to proceed and, if so, under what conditions. This communication is necessary because, in systems with caches, the most recent valid copy of a given block of memory may have moved from memory subsystem 344 to one or more of the caches in the system. When a processor wishes to read or write a block, it must communicate that desire with the other processing units in the system in order to maintain cache coherence. To achieve this, the cache-coherence protocol associates, with each block in each level of the cache hierarchy, a status indicator indicating the current "state" of the block. The state information is used to allow certain optimizations in the coherency protocol that reduce transaction traffic on generalized interconnect 343 and inter-cache connections 340x, 340y, 341x, 341y, 342x, 342y. As one example of this mechanism, when a processing unit executes a read transaction, it receives a message or signals indicating whether or not the read transaction must be retried later. If the read transaction is not retried, the message usually also includes information allowing the processing unit to determine if any other processing unit also has a still active copy of the block (this is accomplished by having the other lowest-level caches give a "shared" or "not shared" indication for any read transaction they do not retry).

Data prefetch unit 345 is used to prefetch cache lines that are likely to be accessed by one of the processors in the future. System performance may be enhanced by satisfying data references from prefetch buffers within the data prefetch unit rather than from the memory subsystem.

Figure 4:
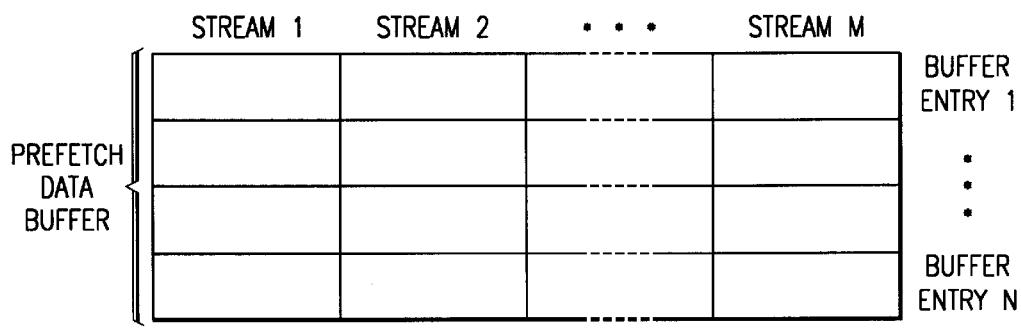
FIG. 4 depicts a prefetch data buffer that may be used within a data prefetch unit is depicted.

With reference now to FIG. 4, a prefetch data buffer that may be used within a data prefetch unit is depicted. The prefetch data buffer is essentially an array that is M-set associative, where "M" denotes the number of streams. In the depicted example, prefetch data buffer consists of stream 1 through stream M, each of which consists of buffer entry 1 through buffer entry N. Prefetching may be selected or deselected through the use of a prefetch bit in the transaction to denote that a prefetch of X proximate addresses of a memory transaction is desired, where "X" may be a static or dynamic number that is system implementation dependent. A prefetch data unit containing a data prefetch buffer with the ability to prefetch proximate data is particularly desirable in scientific applications in which data references are more or less sequential. The number of streams and the number of buffer entries per stream may vary with system implementation.

Each memory transaction requested by one of the processors is tagged. A set of bits in the address field of a transaction are used to determine if prefetching is desired, the stream identifier, and the direction of prefetching. Prefetching may be selected or deselected through the use of a prefetch bit. The direction bit dictates whether descending or ascending prefetch addresses will be generated by the data prefetch unit. A stream identifier or a set of stream identifying bits are used to denote to which stream those prefetch addresses should be allocated. Hence, for a read transaction at address "A", assuming an ascending direction has been chosen, prefetch addresses (A+1) to (A+X) will generated for the stream indicated by the stream identifying bits.

The buffer entries in each stream are fully associative. M-way set associative denotes that the M steams have fully addressable buffers, i.e. the generated prefetch address or addresses can be placed in any buffer entry for the stream if the entry is not reserved. In this manner, prefetching of data is not required to be sequential, i.e. the prefetch data buffer in FIG. 4 allows non-sequential data prefetch. Each buffer entry has a comparator that allows hits or matches on any entry in the prefetch array.

Since the prefetch array is fully addressable, entry deallocation is simple. If data has returned from the memory subsystem for an entry in which some type of invalidation condition is present, the entry can transition to an unreserved or unallocated state on the next cycle. With this scheme, one or more buffer entries may be freed without flushing the entire stream, as is required when using FIFO (first in/first out) buffers.

As noted earlier, system performance may be enhanced by satisfying data references from prefetch buffers within the data prefetch unit rather than from the memory subsystem. However, in some situations, while an attempt is being made to prefetch data from an address proximate to an address in a first read transaction, a second prefetch transaction may be issued for the address already being prefetched. In other words, the second prefetch transaction hits on another prefetch buffer entry because their addresses match.

The present invention is a method and system for reissuing load requests in a multi-stream prefetch design. When a requested prefetch transaction hits on a prefetch buffer entry, the base address for which data is being prefetched may be held as a pending address and reissued. An attempt is made to keep the prefetch engine occupied retrying prefetch requests in order to fully utilize the capacity of the prefetch buffer.

Figure 5:
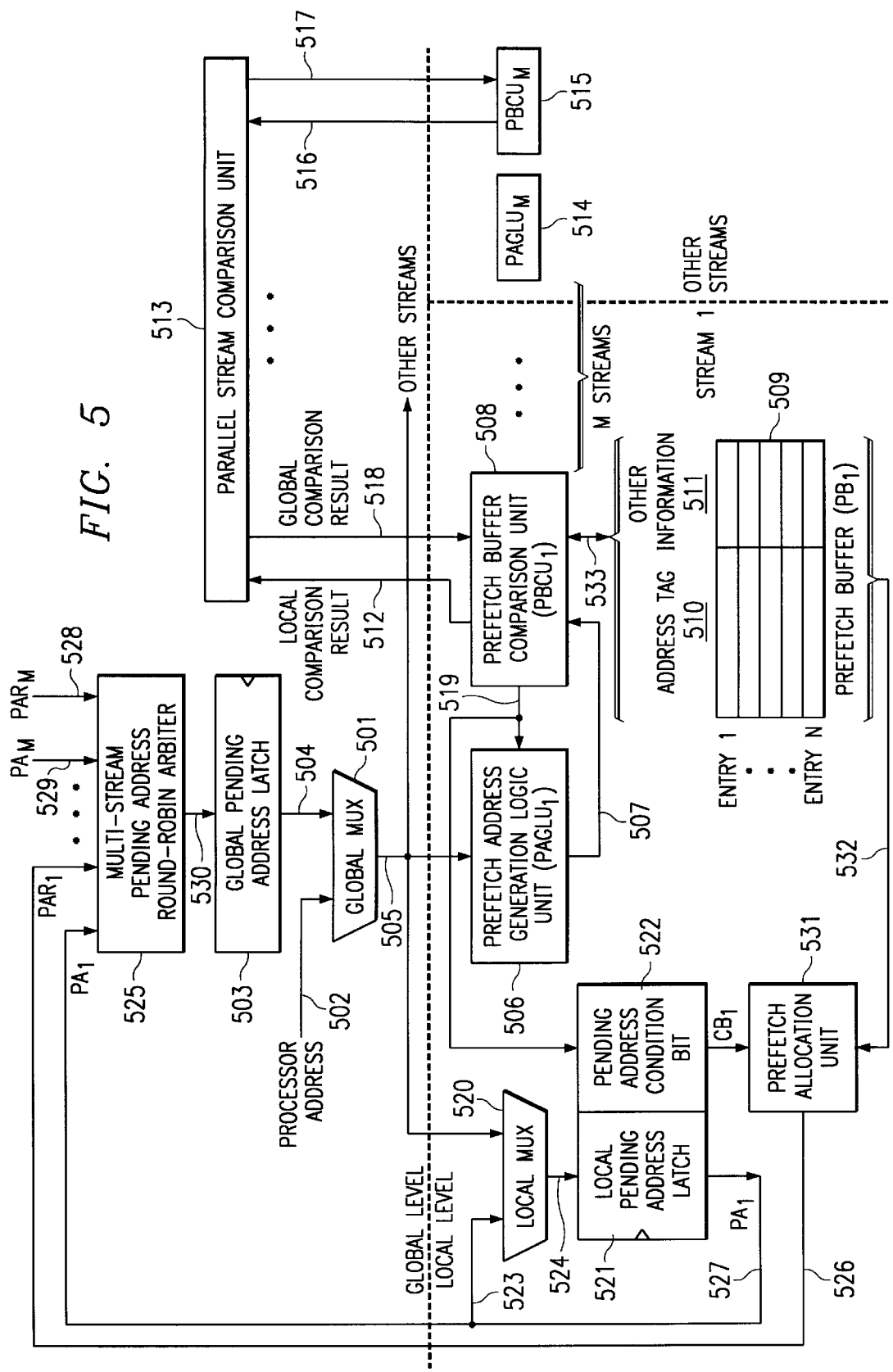
FIG. 5 is a block diagram depicting a data prefetch unit for prefetching data via multiple prefetch streams.

With reference now to FIG. 5, a block diagram depicts a data prefetch unit for prefetching data via multiple prefetch streams. The components in the figure are generally arranged both vertically and horizontally. The upper portion of the figure contains the components that are relevant to the processing of all of the multiple data streams. The components of the lower portion of the figure are relevant to the processing of each individual stream. The upper and lower portions of the figure are labeled as a global and local level, respectively. FIG. 5 shows the components at the local level divided among "M" streams. The number of streams that may be supported in the data prefetch unit may vary depending upon system implementation.

Global multiplexor 501 selects between processor address 502 and a global pending address in global pending address latch 503 via signal 504. A global pending address will be described in more detail further below. Processor address 502 represents an address for a transaction received from a processor, I/O device, or similar transaction requester. If global multiplexor 501 sees two valid addresses, processor address 502 has priority over the global pending address. The selected address is sent to the prefetch logic for each of the streams via signal 505.

When a read transaction with the prefetch bit set is received, the logic in each prefetch stream will generate a set of prefetch addresses off the base address of the incoming transaction. These addresses are then compared locally with entries in each stream's prefetch buffers. This local result is sent to a parallel comparison unit, which combines all the "local" results to form a global result that is rebroadcast to all the streams. The global and local results determine whether the addresses are colliding or non-colliding. If the stream identifier of the incoming transaction with the prefetch bit set also matches the stream number for a particular stream, then that stream will attempt to allocate all non-colliding prefetch addresses to its prefetch buffers. Otherwise, the selected address will be ignored at that point in time by a particular stream whose stream number does not match the stream ID of the processor address. The remainder of the description focuses on the data prefetch processing logic with respect to Stream 1.

The address is accepted by prefetch address generation logic unit (PAGLU$_1$) 506. In an attempt to increase the processing speed of the overall system, data at addresses proximate to an address within a requested transaction are prefetched into a prefetch buffer and stored in anticipation of a future request at one of the prefetched addresses. PAGLU$_1$ may fetch successive addresses if fetching in a "up" direction or may fetch preceding addresses if fetching in a "down" direction. For a base address A, addresses (A+1), (A+2),... (A+N), etc., may be generated if fetching upward, and addresses (A−1), (A−2), (A−N), etc., may be generated if fetching downward. PAGLU$_1$ sends the addresses via signal 507 to its prefetch buffer comparison unit (PBCU$_1$) 508. Each PBCU for each stream generates the addresses in parallel for comparison. PBCU$_1$ determines whether the prefetch buffer for Stream 1 has an unallocated prefetch buffer entry for storing and queuing the prefetch request. PBCU$_1$ 508 reads prefetch buffer 509 via signal 533 and compares the prefetch address with the addresses stored in entries 1 through N. Each entry in prefetch buffer 509 contains address tag 510 and other information 511. Address tag 510 is an address at which data has been requested to be prefetched. Other information 511 may contain a transaction type and various status flags for providing information to other logic or processing units not shown.

PBCU$_1$ 508 sends its local comparison result 512 to parallel stream comparison unit 513. Logic units for other streams have similar capability, such as PAGLUM 514 and PBCU$_M$ 515. For example, PBCU$_M$ compares each newly generated prefetch address with the addresses in its prefetch buffers. PBCU$_M$ 515 then relays its local comparison result 516 to parallel stream comparison unit 513. Each stream receives the result of a global comparison of all of the local comparison result signals. For instance, PBCU$_M$ 515 receives global comparison result signal 517.

Resuming with the description of the processing within Stream 1, PBCU$_1$ 508 receives global comparison result 518 that indicates whether the prefetch address generated by PAGLU$_1$ 506 collides with any addresses in the prefetch buffer entries of any of the other streams. PBCU$_1$ 508 then notifies PAGLU$_1$ 506 via signal 519 whether all non-colliding prefetch addresses have been queued to be issued within available empty prefetch buffer entries for Stream 1.

Each multiplexor that is local to a stream may latch a base address from the global multiplexor if the base address has a stream ID that corresponds to the stream for the local multiplexor. If global multiplexor 501 presents a base address with a stream ID for Stream 1, local multiplexor 520 may select the base address to be stored in local pending address latch 521. If a base address is presented by global multiplexor 501 for other streams, local multiplexor 520 ignores the base address.

PBCU$_1$ 508 sends signal 519 that is stored as pending address condition bit 522 along with the local pending address in local pending address latch 521. Pending address condition bit 522 is set for a stream under two conditions: (1) all entries in the prefetch buffer for the stream are occupied and at least one non-colliding prefetch address exists; or (2) after allocating all non-colliding prefetch addresses to entries in the prefetch buffer for the stream, there remains at least one prefetch address in the set of prefetch addresses generated from the base address.

Local pending address latch 521 cycles the local pending address via signal 523 to local multiplexor 520 until a new base address is accepted by local multiplexor 520. Once a new base address for Stream 1 is accepted by local multiplexor 520, the new base address will be latched into local pending latch 521 via signal 524.

Prefetch allocation unit 531 receives pending address condition bit 522 while determining whether prefetch buffer 509 has an empty entry. If the pending address condition bit is set and the prefetch buffer has an unallocated entry, then prefetch allocation unit 531 sends pending address request bit 526 to a round-robin arbiter.

The pending address request bit and the local pending address for Stream 1 are sent to multi-stream pending address round-robin arbiter 525 via signals 526 and 527, respectively. By saving the local pending base address for a stream and forwarding the base address to arbiter 525, speculative read requests are saved and reissued to the data prefetch unit in a manner which fully utilizes the prefetch buffer while also attempting to prefetch all of the prefetch addresses for a set of prefetch addresses off a particular base address.

Arbiter 525 receives pending address request bit signals and pending addresses, such as PAR$_1$ 526, PA$_1$ 527, PAR$_M$ 528, and PA$_M$ 529, from each prefetch stream that has a pending address condition. Arbiter 525 uses a round-robin algorithm to determine the next pending address that should be selected for use or comparison within the prefetch streams. Global pending address latch 503 accepts the pending address via signal 530 and holds the global pending address until chosen by global multiplexor 501. If the global pending address is selected by global multiplexor 501, then the stream with a stream identifier that corresponds to the stream identifier in the global pending address will accept the global pending address as a base address for generating a set of prefetch addresses that are proximate to the base address. In this manner, conditions may at first prevent a prefetch address from being issued for a particular stream, but the base address is recycled through the system to ensure that an attempt is made to prefetch a consistent stream of prefetch addresses.

Figures 6, 7:
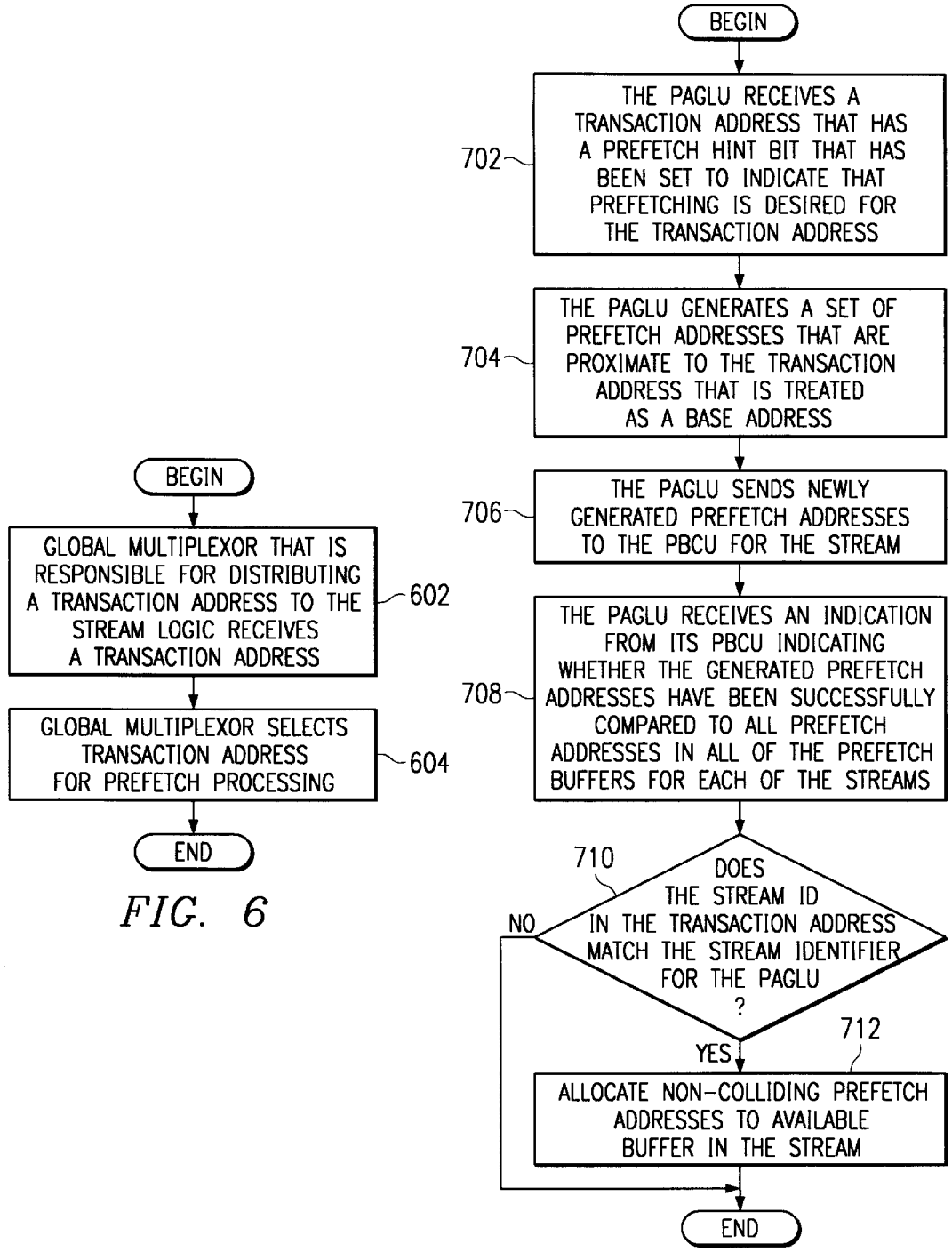
FIG. 6 is a flowchart depicting the processing of a transaction address received by a prefetch engine.
FIG. 7 is a flowchart depicting a process performed by a prefetch address generation logic unit (PAGLU) for a particular prefetch stream.

With reference now to FIG. 6, a flowchart depicts the processing of a transaction address received by a prefetch engine. A global multiplexor that is responsible for distributing a transaction address to the stream logic receives a transaction address (step 602). The global multiplexor selects the transaction address for prefetch processing as a higher priority over a pending address (step 604), and the process is completed.

With reference now to FIG. 7, a flowchart depicts a process performed by a prefetch address generation logic unit (PAGLU) for a particular prefetch stream. The process begins when the PAGLU receives a transaction address that has a prefetch hint bit that has been set to indicate that prefetching is desired for the transaction address (step 702).

The PAGLU generates a set of prefetch addresses that are proximate to the transaction address that is treated as a base address (step 704). The transaction address may also have an associated direction indicator that indicates whether prefetch addresses are desired in a positive or negative direction with respect to the base address. The PAGLU sends newly generated prefetch addresses to the prefetch buffer comparison unit (PBCU) for the stream (step 706). The PAGLU receives an indication from its PBCU indicating whether the generated prefetch addresses have been successfully compared to all prefetch addresses in all of the prefetch buffers for each of the streams (step 708).

Depending upon whether the indication is positive or negative, the PAGLU may act in a variety of ways. If a negative indication is received, then the PAGLU may proceed by attempting to issue other prefetch addresses, or it may pause a predetermined amount of time before attempting to reissue current prefetch addresses. The internal logic of the PAGLU may vary depending upon the system implementation and the functionality desired with respect to a data prefetch unit.

A determination is then made as to whether the stream ID in the transaction address matches the stream identifier for the PAGLU (step 710). If not, then the PAGLU ignores the transaction address and the processing is complete with respect to a particular PAGLU.

If the stream ID is appropriate, then each non-colliding, newly generated address is allocated a buffer entry until all available or open buffer entries are filled (step 712).

The method by which the non-colliding prefetch addresses are allocated to prefetch buffer entries may vary depending upon system implementation. Preferably, the PAGLU receives a positive or negative indication of issuance for each prefetch address. The PAGLU may maintain an internal table of prefetch addresses for a current base address from which the PAGLU tracks the issuance of generated prefetch addresses. As the PAGLU receives an indication that a generated prefetch address has been issued, the PAGLU deletes the prefetch address from its internal table. However, if a new transaction address is accepted for prefetch processing within the stream, the new transaction address replaces the previous transaction address as the base address, and a new set of prefetch addresses proximate to the base address would be generated and stored in the table.

Figure 8:
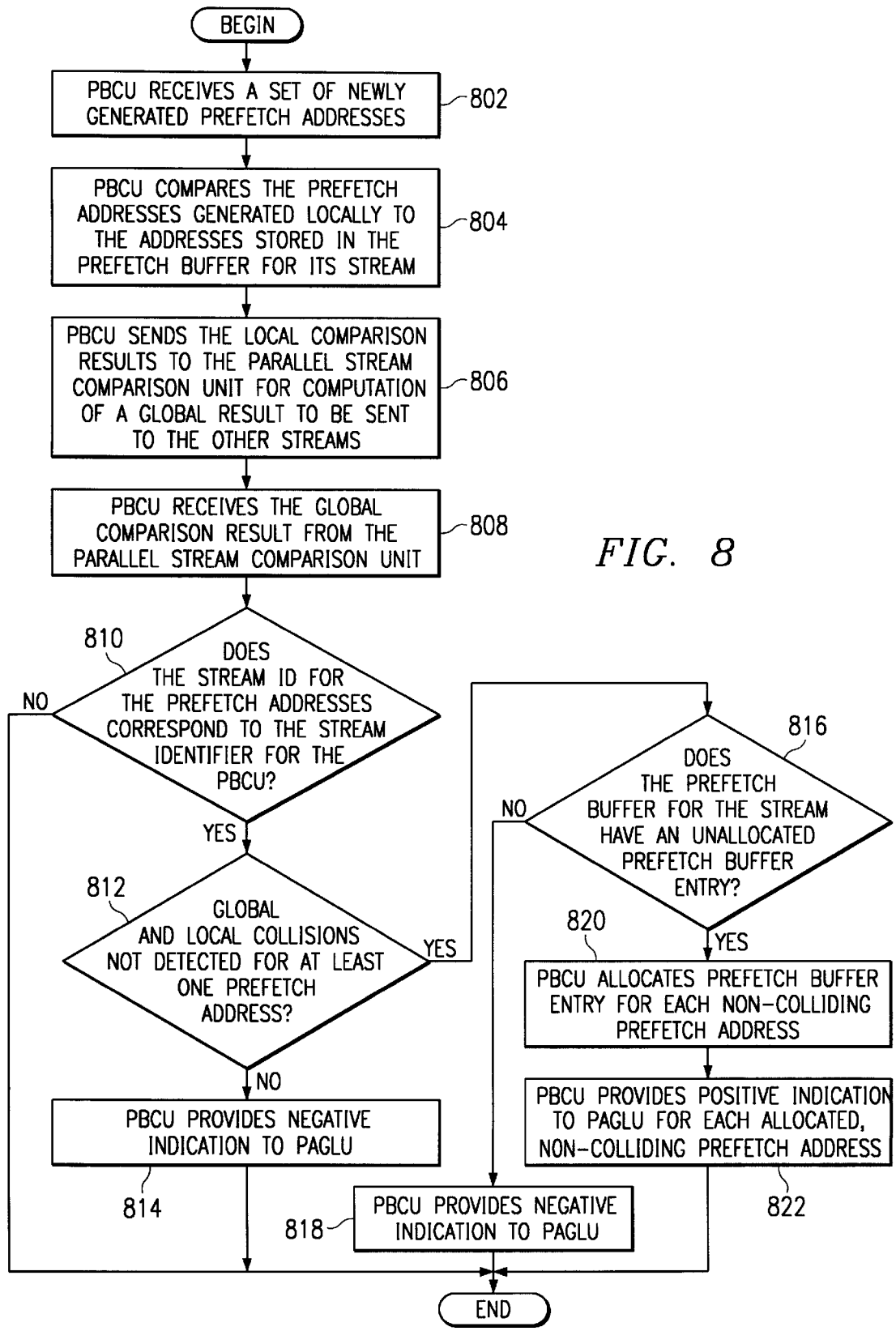
FIG. 8 is a flowchart depicting the processing for comparing generated prefetch addresses received from prefetch address generation logic units.

With reference now to FIG. 8, a flowchart depicts the processing for a prefetch address. The process begins when the PBCU receives a set of newly generated prefetch addresses (step 802). The set of prefetch addresses are compared with the prefetch addresses stored in the prefetch buffer to determine whether the newly generated prefetch addresses collide with any of the addresses within the prefetch buffer (step 804). The result of the prefetch address comparison is then sent to a parallel stream comparison unit (step 806), and the PBCU then receives the global comparison results from the parallel stream comparison unit (step 808).

A determination is then made as to whether the newly generated prefetch addresses contain a stream ID for the stream corresponding to the PBCU (step 810). If not, then the process is completed from the perspective of one of the streams other than the stream corresponding to the current PBCU.

If the newly generated prefetch addresses contain a stream ID for the stream corresponding to the PBCU, a determination is made as to whether the global and local comparison results indicate that one or more of the newly generated prefetch addresses do not collide with addresses across all the streams (step 812). If not, then the PBCU provides a negative indication to the PAGLU (step 814).

If one or more of the newly generated prefetch addresses do not collide, then a determination is made as to whether the prefetch buffer contains an empty or unallocated prefetch buffer entry into which a non-colliding, newly generated prefetch address may be stored for issuance (step 816). If not, then the PBCU provides a negative indication to the PAGLU (step 818). If so, then the PBCU allocates the non-colliding addresses to empty prefetch buffer entries (step 820). The PBCU then provides a positive indication to the PAGLU for each allocated, non-colliding prefetch address (step 822), and the process is then completed with respect to a set of prefetch addresses received from the PAGLU for the stream.

The steps of the process described in FIG. 8 may be summarized as follows. When Stream 1 receives a Read transaction with its hint bit set, Stream 1 generates a set of prefetch addresses and then compares them locally and in parallel. All of the other streams perform the same action since they need to generate a local match vector to send to the parallel stream comparison unit. All of these actions are performed in parallel for high performance. At the same time, Stream 1 makes a decision as to the availability of buffers in the current stream. When the global comparison results are available, the non-colliding addresses are allocated buffer entries until all are filled. Once this is complete, each of these new addresses are sent out as prefetch requests to the system. If there are left over prefetch addresses after allocation or there were no buffers available in the first place, the base address is saved in the pending latch for Stream 1.

Figure 9:
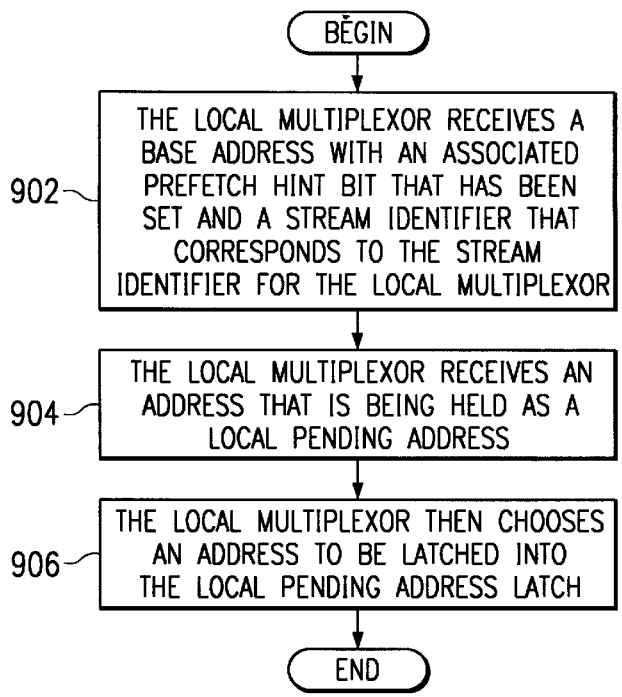
FIG. 9 is a flowchart depicting the processing for latching a local pending address within a prefetch stream.

With reference now to FIG. 9, a flowchart depicts the processing for latching a local pending address within a prefetch stream. The process begins when the local multiplexor receives a base address with an associated prefetch hint bit that has been set and a stream identifier that corresponds to the stream identifier for the local multiplexor (step 902). The local multiplexor also receives an address that is being held as a local pending address (step 904). The local multiplexor then chooses an address to be latched into the local pending address latch (step 906). If a new base address with the proper stream ID is received, then the local multiplexor stores the address within the local pending address latch. If no new base address is received, then the local pending address is re-latched into the local pending address latch until reset by a newly received base address. In this manner, a local base address may be held until it may be reissued to the prefetch engine or until an appropriate pending address condition is cleared.

Figure 10:
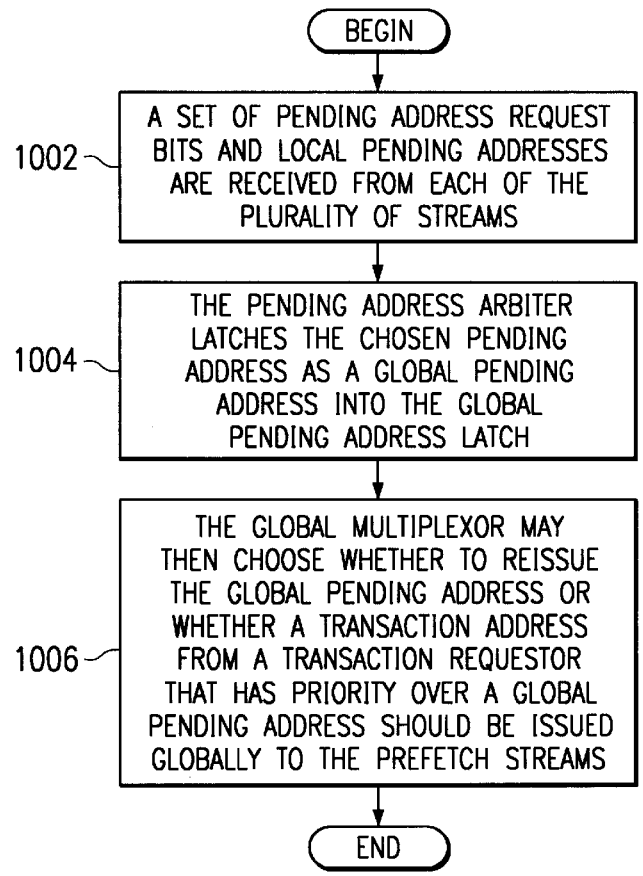
FIG. 10 is a flowchart depicting the processing performed by a pending address arbiter within the prefetch engine.

With reference now to FIG. 10, a flowchart depicts the processing performed by a pending address arbiter within the prefetch engine. The process begins when a set of pending address request bits and local pending addresses are received from each of the plurality of streams (step 1002). If the prefetch logic for a particular stream has not been able to issue a complete set of prefetch addresses generated from a base address, the prefetch logic for the stream may re-circulate the base address in another attempt to issue prefetch addresses for the base address.

As explained above with respect to FIG. 5, The pending address request bit indicates to the pending address arbiter whether a particular stream desires to have its local pending address considered for reissuance. The pending address condition bit is set for a stream when all of the entries in a prefetch buffer for the stream are occupied and at least one non-colliding prefetch address exists or after allocating all non-colliding prefetch addresses to prefetch buffer entries, there is at least one prefetch address that has not been allocated. The pending address condition bit is reset for a stream when a new base address with the hint bit set and stream identifier bits matching that stream's ID are received.

The pending address arbiter may use a round-robin algorithm for determining which pending address should be chosen from the streams which have pending addresses to be re-circulated as indicated by their pending address condition bits. The pending address arbiter then latches the chosen pending address as a global pending address into the global pending address latch (step 1004). The global multiplexor may then choose whether to reissue the global pending address or whether a transaction address from a transaction requestor that has priority over a global pending address should be issued globally to the prefetch streams (step 1006). The process is then complete with respect to the processing for a global pending address.

The advantages of the present invention should be apparent to one of ordinary skill in the art in light of the detailed description of the invention provided above. Previous solutions for handling additional prefetch requests have generally utilized increasingly larger prefetch buffer sizes. However, in a design with fully associative prefetch buffers, the control logic can be increasingly complex as the size of the prefetch buffers increases. Moreover, prefetch systems that use first-in-first-out queues cannot handle additional prefetch requests if the prefetch buffers are full. The present invention attempts to fully utilize the prefetch buffers by saving an address request when the prefetch buffers are full and reissuing the requested address as entries in the prefetch buffer become available.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for prefetching data in a data processing system by using data prefetch transactions, the method comprising the steps of:

receiving a read transaction from a transaction requester, the read transaction comprising a base address;

generating a prefetch address proximate to the base address;

determining whether the prefetch address collides with an address in a prefetch buffer;

determining whether the prefetch buffer has an unallocated prefetch buffer entry; and in response to a determination of an absence of an address collision and a determination that the prefetch buffer does not have an unallocated prefetch buffer entry, holding the base address to be reissued for data prefetch processing.

2. The method of claim 1 further comprising:

in response to a determination of an absence of an address collision and a determination that the prefetch buffer has an unallocated prefetch buffer entry, allocating the unallocated prefetch buffer entry to the prefetch address.

3. The method of claim 1 wherein the generated prefetch address is higher or lower than the base address according to a predetermined indicator.

4. The method of claim 1 further comprising:

reissuing the base address for data prefetch processing.

5. A method for prefetching data in a data processing system by using data prefetch transactions, the method comprising the steps of:

receiving a read transaction from a transaction requester, the read transaction comprising a base address and a prefetch stream identifier;

issuing the received read transaction to a prefetch stream associated with a first data prefetch buffer identified by the prefetch stream identifier, wherein the prefetch stream is one of a plurality of prefetch streams;

generating a first prefetch address proximate to the base address;

determining whether the first data prefetch buffer has an unallocated prefetch buffer entry;

determining whether the first prefetch address collides with a second prefetch address in a second data prefetch buffer; and in response to a determination of an absence of an address collision and a determination that the first data prefetch buffer does not have an unallocated prefetch buffer entry, holding the base address for data prefetch reissuance.

6. The method of claim 5 further comprising:

in response to a determination of an absence of an address collision and a determination that the first data prefetch buffer has an unallocated prefetch buffer entry, allocating the unallocated prefetch buffer entry to the first prefetch address.

7. The method of claim 5 wherein the first prefetch address is higher or lower than the base address according to a predetermined indicator.

8. The method of claim 5 further comprising:

presenting the base address for data prefetch reissuance.

9. The method of claim 5 further comprising:

selecting a base address for data prefetch reissuance from a plurality of base addresses pending data prefetch reissuance.

10. The method of claim 9 wherein the base address for data prefetch reissuance is selected according to an arbitration scheme.

11. The method of claim 9 wherein each prefetch stream in the plurality of prefetch streams holds a base address for data prefetch reissuance.

12. The method of claim 5 further comprising:

generating a local comparison result for each prefetch stream by determining whether the first prefetch address collides with a prefetch address in any of the data prefetch buffers; and combining local comparison results to generate a global comparison result that indicates whether the first prefetch address collides with any prefetch address in any of the plurality of data prefetch buffers.

13. A method for prefetching data in a data processing system by using data prefetch transactions, the method comprising the steps of:

receiving a read transaction from a transaction requestor, the read transaction comprising a base address and a prefetch stream identifier, wherein the prefetch identifier identifies a prefetch stream in a set of prefetch streams, wherein each prefetch stream in the set of prefetch streams is associated with a data prefetch buffer;

issuing the read transaction to a prefetch stream associated with a first data prefetch buffer;

generating a set of prefetch addresses, each prefetch address in the set of prefetch addresses being proximate to the base address;

determining whether the first data prefetch buffer has an unallocated prefetch buffer entry;

comparing each prefetch address in the set of prefetch addresses to all prefetch addresses in each data prefetch buffer to determine whether a prefetch address in the set of prefetch addresses collides with a prefetch address in a data prefetch buffer; and in response to a determination of an address non-collision for one or more prefetch addresses in the set of prefetch addresses and a determination that the first data prefetch buffer does not have an unallocated prefetch buffer entry, holding the base address for data prefetch reissuance.

14. The method of claim 13 wherein each prefetch stream in the set of prefetch streams holds a base address for data prefetch reissuance.

15. A data processing system for prefetching data by using data prefetch transactions, the data processing system comprising:

receiving means for receiving a read transaction from a transaction requestor, the read transaction comprising a base address and a prefetch stream identifier;

issuing means for issuing the received read transaction to a prefetch stream associated with a first data prefetch buffer identified by the prefetch stream identifier, wherein the prefetch stream is one of a plurality of prefetch streams;

first generating means for generating a first prefetch address proximate to the base address;

first determining means for determining whether the first data prefetch buffer has an unallocated prefetch buffer entry;

second determining means for determining whether the first prefetch address collides with a second prefetch address in a second data prefetch buffer; and holding means for holding, in response to a determination of an absence of an address collision and a determination that the first data prefetch buffer does not have an unallocated prefetch buffer entry, the base address for data prefetch reissuance.

16. The data processing system of claim 15 further comprising:

allocating means for allocating, in response to a determination of an absence of an address collision and a determination that the first data prefetch buffer has an unallocated prefetch buffer entry, the unallocated prefetch buffer entry to the first prefetch address.

17. The data processing system of claim 15 wherein the first prefetch address is higher or lower than the base address according to a predetermined indicator.

18. The data processing system of claim 15 further comprising:

presenting means for presenting the base address for data prefetch reissuance.

19. The data processing system of claim 15 further comprising:

selecting means for selecting a base address for data prefetch reissuance from a plurality of base addresses pending data prefetch reissuance.

20. The data processing system of claim 19 wherein the base address for data prefetch reissuance is selected according to an arbitration scheme.

21. The data processing system of claim 19 wherein each prefetch stream in the plurality of prefetch streams holds a base address for data prefetch reissuance.

22. The data processing system of claim 15 further comprising:

second generating means for generating a local comparison result for each prefetch stream by determining whether the first prefetch address collides with a prefetch address in any of the data prefetch buffers; and combining means for combining local comparison results to generate a global comparison result that indicates whether the first prefetch address collides with any prefetch address in any of the plurality of data prefetch buffers.

23. A computer program product in a computer-readable medium for use in a distributed data processing system for prefetching data in a data processing system by using data prefetch transactions, the computer program product comprising the steps of:

first instructions for receiving a read transaction from a transaction requester, the read transaction comprising a base address and a prefetch stream identifier;

second instructions for issuing the received read transaction to a prefetch stream associated with a first data prefetch buffer identified by the prefetch stream identifier, wherein the prefetch stream is one of a plurality of prefetch streams;

third instructions for generating a first prefetch address proximate to the base address;

fourth instructions for determining whether the first data prefetch buffer has an unallocated prefetch buffer entry;

fifth instructions for determining whether the first prefetch address collides with a second prefetch address in a second data prefetch buffer; and sixth instructions for in response to a determination of an absence of an address collision and a determination that the first data prefetch buffer does not have an unallocated prefetch buffer entry, holding the base address for data prefetch reissuance.

24. The computer program product of claim 23 further comprising:

instructions for selecting a base address for data prefetch reissuance from a plurality of base addresses pending data prefetch reissuance.

25. The computer program product of claim 24 wherein each prefetch stream in the plurality of prefetch streams holds a base address for data prefetch reissuance.

* * * * *

UNITED STATES PATENT AND TRADEMARK OFFICE
CERTIFICATE OF CORRECTION

PATENT NO. : 6,317,811 B1  Page 1 of 1
DATED : November 13, 2001
INVENTOR(S) : Deshpande et al.

It is certified that error appears in the above-identified patent and that said Letters Patent is hereby corrected as shown below:

Title page,
ABSTRACT, line 4, delete "requester" and insert -- requestor --;

Column 6,
Line 1, after "entry", delete "deal-location" and insert -- de-allocation --;

Column 7,
Line 12, after "addresses.", "PAGLU1" should be a new paragraph;

Column 11,
Line 43, after "from a transaction", delete "requester" and insert -- requestor --;

Column 12,
Line 4, after "from a transaction", delete "requester" and insert -- requestor --;

Column 14,
Line 27, delete "transaction requester," and insert -- transaction requestor --.

Signed and Sealed this

Second Day of April, 2002

Attest:

JAMES E. ROGAN
*Attesting Officer*    *Director of the United States Patent and Trademark Office*